Aug. 5, 1969  A. STICKEL ETAL  3,459,526
APPARATUS FOR BENDING GLASS SHEETS WITH ALIGNING MEANS
Filed Jan. 24, 1966  3 Sheets-Sheet 1

INVENTORS
Allwin Stickel and
Floyd P. Hagedorn
BY
Nobbe & Swope
ATTORNEYS

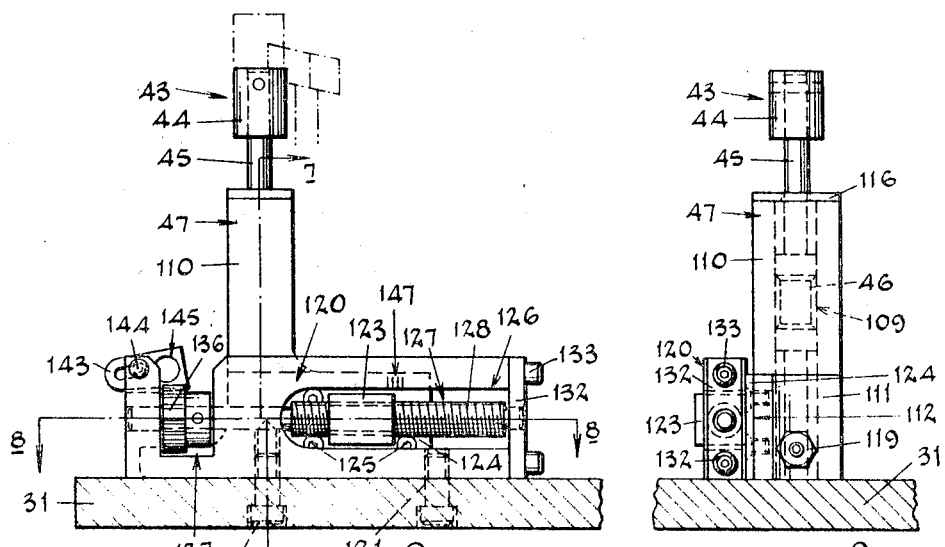
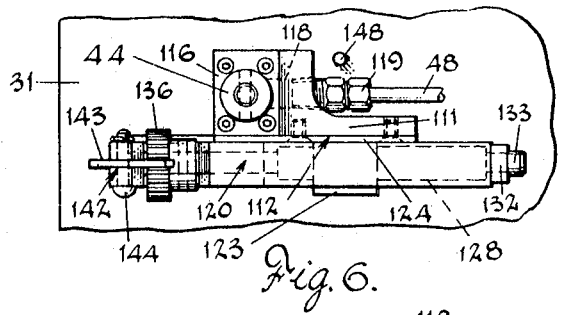
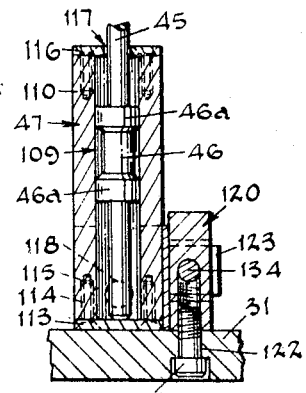
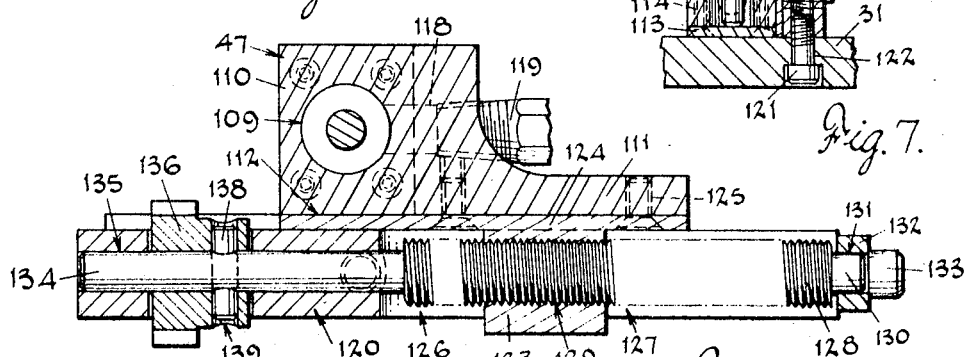
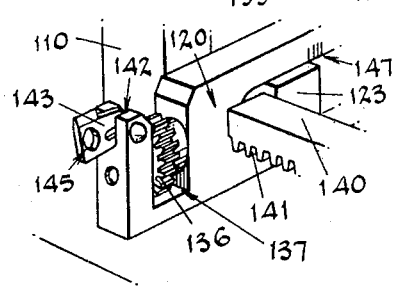

Aug. 5, 1969 A. STICKEL ET AL 3,459,526
APPARATUS FOR BENDING GLASS SHEETS WITH ALIGNING MEANS
Filed Jan. 24, 1966 3 Sheets-Sheet 3

INVENTORS
Allwin Stickel and
Floyd P. Hagedorn
BY
Nobbe & Swope
ATTORNEYS

United States Patent Office 3,459,526
Patented Aug. 5, 1969

3,459,526
APPARATUS FOR BENDING GLASS SHEETS WITH ALIGNING MEANS
Allwin Stickel, Toledo, and Floyd T. Hagedorn, Oregon, Ohio, assignors to Libbey-Owens-Ford Glass Company, Toledo, Ohio, a corporation of Ohio
Filed Jan. 24, 1966, Ser. No. 522,702
Int. Cl. C03b 23/00
U.S. Cl. 65—289       5 Claims

ABSTRACT OF THE DISCLOSURE

Adjustable stops for positioning the sheets in a glass sheet bending apparatus. The stops are pneumatically actuated and are independently adjustable to permit the angular relationships of the sheet relative to the bending mold to be varied, and means are provided to effect the adjustments remotely so that they can be made while the apparatus remains in operation.

---

This invention relates generally to the production of curved glass sheets and more particularly to improved apparatus for bending glass sheets.

In recent years, curved glass sheets have been rather widely used as glazing closures particularly in windows for vehicles, such as automobiles and the like. The employment of curved sheets for this purpose requires that the sheets be bent to rather precisely defined curvatures dictated by the configuration of the opening in which they are to be mounted and by the over-all design of the automobile. In addition, those surfaces of the sheet within the viewing area of the window must be free from mars or defects which would tend to interfere with clear vision through the window.

Usually, curved glass sheets intended for use in the rear and side lights of automobiles are tempered to increase their resistance to damage due to impact and to improve the breaking characteristics of the glass whereby, when broken, the tempered sheets will disintegrate into relatively small, harmless particles as opposed to the rather large, jagged pieces resulting when ordinary, untempered glass is broken.

One procedure by which curved, tempered sheets of glass may be produced is by heating flat sheets to their bending temperature, pressing the heated sheets to the desired curvature between complemental shaping surfaces and then chilling the sheets to rapidly reduce their temperature to a point below the annealing range of the glass.

In producing curved windows for vehicles in relatively large quantities on a mass production basis, the sheets are heated, bent and subsequently tempered in a substantially continuous procedure. To this end, the sheets to be treated are moved successively along a predetermined path through a heating area, a bending area and a tempering area, which areas are contiguous so that a sheet, after moving through one area, passes immediately into and through the following area.

The primary object of the present invention is to increase the efficiency of such a continuous process of shaping glass sheets.

Another object is to accomplish the above by providing a bending apparatus which is capable of bending glass sheets of varying sizes and shapes.

A further object is to provide improved locating means that make it possible for different sizes of glass sheets to be bent to different curvatures on a single mold in a continuous operation.

Other objects and advantages of the invention will become more apparent during the course of the following description when read in connection with the accompanying drawings.

In the drawings, wherein like numerals are employed to designate like parts throughout the same:

FIG. 4 is an enlarged fragmentary vertical section taken along lines 4—4 of FIG. 2;

FIG. 5 is an end view of the details shown in FIG. 4;

FIG. 6 is a plan view of the details shown in FIG. 4;

FIG. 7 is a vertical sectional view taken along lines 7—7 of FIG. 4;

FIG. 8 is a longitudinal sectional view taken along lines 8—8 of FIG. 4.

FIG. 9 is a fragmentary perspective view of the adjusting means included in the present invention.

Figure 1:
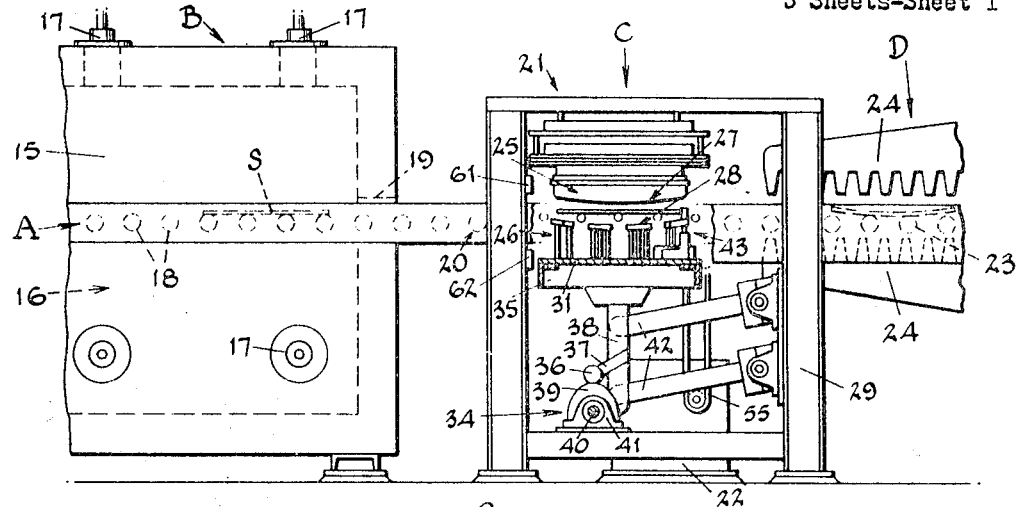
FIG. 1 is a side elevational view of a bending and tempering apparatus incorporating the features of the present invention.

For the purpose of illustration, the novel features of the present invention are shown incorporated in a bending and tempering apparatus particularly adapted for use in the production of bent, tempered glass sheets by a continuous process. This apparatus, as shown in FIG. 1, includes a conveyor system A adapted to support a plurality of sheets S in a horizontal plane for movement along a predetermined path through a heating section B, a bending section C and a tempering section D disposed end to end along the path.

In the illustrated embodiment, the heating section B comprises a tunnel-type furnace 15 having a heating chamber 16 defined by walls constructed of a suitable refractory and heated by burners or equivalent heating devices 17 to bring the sheets to the proper bending temperature. The sheets S are advanced through the heating chamber 16 on a roller type conveyor 18 driven by a power source (not shown), which forms a part of the conveyor system A, and extends from the entrance end (not shown) of the furnace to the oppositely disposed exit end. The sheets are heated to substantially the softening point of the glass during their passage through the chamber 16 and, upon emerging from an opening 19 in the exit end of the furnace, are received on a second roller type conveyor 20, which is also part of the conveyor system A, to be moved into the bending section C, past a bending means 21, which presses the sheets to the desired curvature. The second conveyor 20 is driven by a multiple speed power source 22, which will be described in more detail hereinafter.

After being bent, the sheets S are advanced along the path and onto a third roller type conveyor 23, also a part of the conveyor system A and driven by a power source (not shown), which moves the sheets into and through the tempering section D wherein their temperature is rapidly reduced to produce the desired temper in the glass. In the illustrated embodiment, the tempering section includes cooling means comprising so-called blast heads 24 disposed above and below the path of the moving sheets and operable to direct opposed streams of cooling fluid, such as air or the like, toward the path and against the opposite surfaces of the sheets moving therealong.

In general, the bending means 21 includes a bending mold having male and female mold parts 25 and 26 adapted to press the heated glass sheets into the desired configuration. For this purpose, complemental interfitting shaping surfaces 27 and 28, conforming in curvature to the sheets when bent, are formed on the opposed faces of the mold parts which are movable relative to each other and to the conveyor 20 to bring the shaping surfaces into pressing engagement with the opposite sides of the heated sheets.

While the desired pressing of the sheets could be effected by moving either or both of mold parts 25 and 26, herein the male mold part 25 is mounted on a suitable framework 29 in a substantially stationary position above the conveyor. The female mold part 26 is supported on the framework for reciprocal motion in a substantially vertical plane toward and away from the male mold part between an open position wherein the mold part 26 is located below the conveyor 20 and a closed position wherein the female mold part is disposed above the conveyor and in close proximity to the male mold part 25. With this arrangement, as a heated sheet is moved by the conveyor 20 into the bending section C and between the mold parts, it is lifted free of the conveyor by the female mold part 26, carried into pressing engagement with the male mold part to bend the sheet and, thereafter, returned to the conveyor to be moved into the tempering section D.

Herein, the female or lower mold part 26 is an open ring type structure having the shaping surface 28 engaging only the marginal portions of the sheets to avoid marring those portions of the undersurface of the sheet which lie within the viewing area of the finished window. For this purpose, the mold part 26 is formed by bars 30 (FIG. 2), preferably of a metal composition or similar material able to withstand the high temperatures to which the mold part is subjected, arranged in a quadrangle conforming in plan to the outline of the glass sheets and having the shaping surface 28 formed on their upwardly directed sides to conform in elevation to the curvature of the sheets when bent.

In order that the female mold part 26 may move through the conveyor 20 between the open and closed positions, the longitudinally extending sides of the ring are made up of short segments of bars arranged end to end with their adjacent ends spaced sufficiently to pass between adjacent rollers of the conveyor 20 (FIG. 1). The bars 30 are supported in the deired position on a base 31 by posts 32 upstanding from the base.

Figure 3:
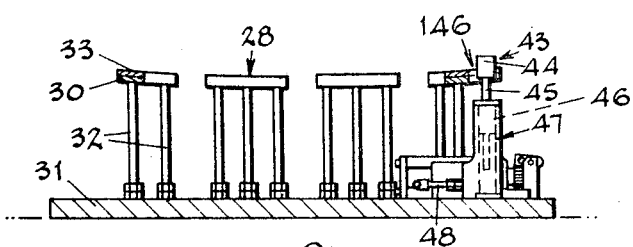
FIG. 3 is a vertical sectional view taken along lines 3—3 of FIG. 2.

During bending, when the female mold part engages the undersurface of the sheets, which are at the elevated bending temperature, the relatively cool bars absorb heat from the contacted areas of the sheets. If the rate of heat absorption is high, as would ordinarily be the case, it results in chill cracks or other imperfections in the contacted areas of the glass. To avoid this, the heat transfer between the sheets and the bars 30 is retarded by providing a heat resistant, insulating covering 33 on the shaping surface 28 (FIG. 3).

Raising and lowering of the female mold part 26 toward and away from the male mold part 25 may be effected by any suitable actuating mechanism 34 (FIG. 1) coupled to a carriage 35 supporting the base 31 of the lower mold part. In the illustrated embodiment, this mechanism comprises a pair of cam and follower arrangements disposed adjacent opposite sides of the carriage carrying the lower mold part. Since the mechanisms are identical in construction, only one is shown in detail and will be described. The mechanism includes a cam follower 36 carried by an arm 37 which is coupled to the carriage by a bar 38 depending therefrom. The cam follower engages and rides on the periphery of a disc cam 39 contoured to impart the desired sequence of motion to the follower 36 and thus to the carriage 35 supporting the female mold part.

The disc cam 39 is fixed on a shaft 40 disposed below the conveyor 20 and journaled in bearings 41 to rotate about a fixed horizontal axis extending transversely of the path. The shaft 40 is coupled to a suitable source of power (not shown) which is operable to rotate the shaft and the cam 39 carried thereby to effect the desired bending sequence.

The female or lower mold part 26 is guided toward the male or upper mold part 25 as it moves between the open and closed positions by parallel, spaced apart, elongated members 42 which are connected to the framework 29 and together with the bar 38 and framework, form a four-bar linkage in which the links are arranged in a parallelogram. The bar 38 and the framework 29 form one pair of parellel links while the members 42, which are pivoted at their opposite ends on the bar 38 and the framework 29, form the other pair of parallel links.

To ensure that each sheet is properly positioned relative to the complemental shaping surfaces of the mold parts, transversely spaced retractable locating devices 43 are provided in the path of the moving sheets so as to engage the leading edges of the sheets as they are moved into position over the lower mold part. Each of the locator devices 43 (FIGS. 1 and 3) includes an enlarged member or stop 44 rigidly secured to one end of a rod 45 having a piston 46 fixed to the rod adjacent the opposite end and slidable in a fluid cylinder 47 secured to the base of the lower mold part 26. Raising of the member 44 is effected by fluid pressure, such as air, from a source (not shown) through conduits 48 (FIG. 2) connected to the lower end of each cylinder while lowering the members is accomplished by gravity acting against the enlarged pistons after the fluid pressure has been removed.

In the operation of the continuous bending and tempering apparatus outlined above, flat glass sheets are loaded onto the conveyor 18 at the entrance end of the furnace and are passed through the heating chamber wherein the sheets are heated to substantially the bending temperature of the glass. As the heated sheets emerge from the opening 19 of the furnace, they are received on the second conveyor 20 which carries the sheets into the bending section C wherein the sheets successively engage the locating devices and are lifted off the conveyor by the lower mold part into pressing engagement between the complemental shaping surfaces and thereafter returned to the conveyor to pass through the tempering or cooling section.

In order to ensure that the temperature of the heated sheets will not decrease below that necessary for proper tempering after being bent, it is desirable to have the sheets carried from the bending area by the conveyor at a higher rate of speed when compared to the rate of speed at which the sheets move through the furnace. For this purpose, the power source 22 is a variable speed transmission unit and as shown diagrammatically in connection with the control circuit (FIG. 10) may include a motor 49 coupled to an input shaft 49a of a magnetic clutch 50 with the shaft being held in position to rotate about a fixed axis. A driving member or armature 51 is fixed on the shaft intermediate its ends to rotate therewith and be selectively engaged by either of two driven members 52 or 53 which are disposed at opposite sides of the driving member and mounted on the shaft to rotate therewith.

The driven members 52 and 53 are coupled to a second or output shaft 54 journaled to rotate about an axis parallel to the axis of the first shaft and the respective driven members are conneced to the second shaft through suitable belts 56 entrained about pulleys 57 connected to the respective shafts. The second shaft is connected to the conveyor 20 by a belt 55.

As is well known, by proper selection of the size of the pulleys, the second shaft may be rotated at either of two speeds depending upon which of the driven members is engaged by the driving member of the clutch. Furthermore, when the clutch is entirely disengaged, rotation of the second shaft is terminated which may be aided by a magnetic brake 58 associated with the shaft and controlled to be activated when the clutch is entirely disengaged.

The means for intermittently raising and lowering the lower mold part includes a combined magnetic clutch 59 and brake 60, commonly identified as a cycle dyne unit, which connects a power source (not shown) to the shaft 40 and controls the rotation of the shaft.

Preferably all phases of each bending sequence or cycle for the respective sheets are automatically controlled by suitable electric circuitry. For this purpose, a light source 61 (FIG. 10) is located at the entrance end of the bending area to produce a restricted beam of light L passing across the path of the moving sheets which beam is received by a photoelectric cell 62. Suitable electric circuitry may be supplied to sequentially operate the various elements or phases of the bending cycle.

Figure 10:
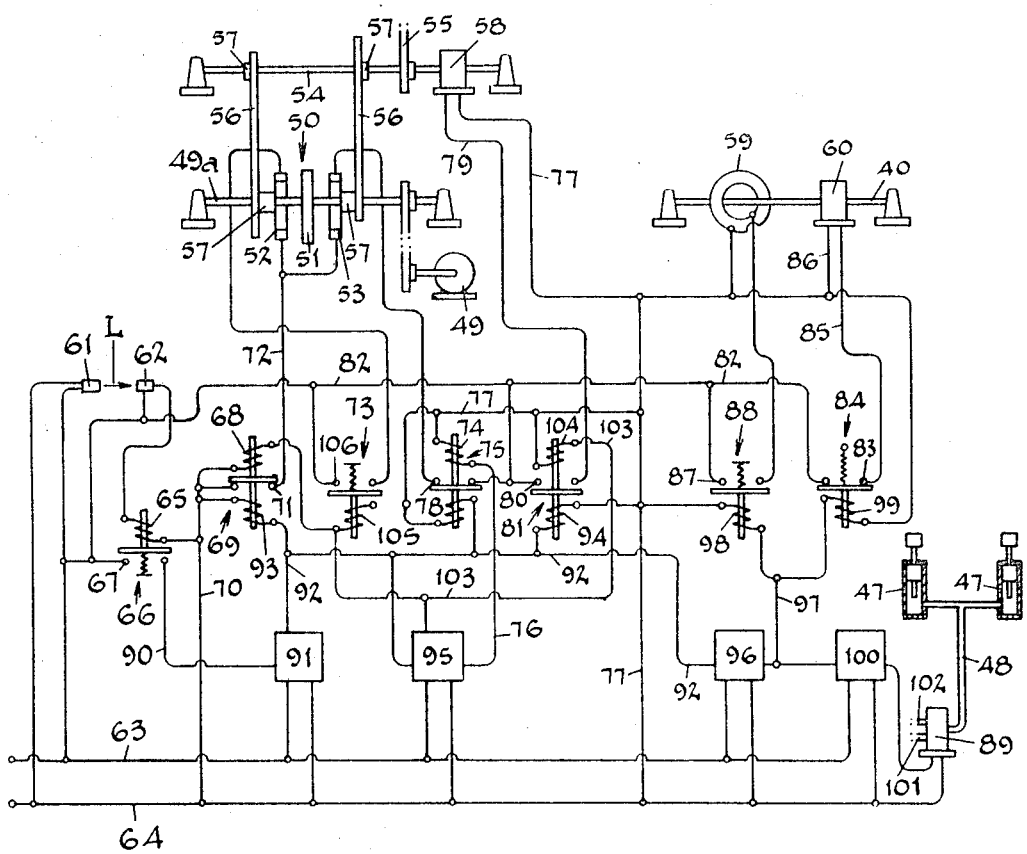
FIG. 10 is a diagrammatic view of an illustrative electrical circuit for controlling the bending cycle of the apparatus shown in FIG. 1.

By way of example, a control circuit for controlling a bending cycle is illustratively shown in FIG. 10. The control circuit includes a power supply from an electric source through supply lines 63 and 64 which are connected to the various elements of the circuit. When the beam of light L is impinging on the photoelectric cell 62, the circuit through the solenoid 65 of spring-biased relay switch 66 is open and the contacts 67 are disengaged. At the same time, the solenoid 68 of relay switch 69 remains energized from a previous bending cycle thereby supplying power via line 70, engaged contacts 71 and line 72 to one side of the magnetic driven members 52 and 53. The circuit through magnetic member 52 is held open by the normally open spring-biased relay switch 73. The solenoid 74 or relay switch 75 remains energized through lines 76 and 77 from a previous bending cycle to thereby complete the circuit between contacts 78 to the second side of the magnetic member 53. The magnetic member 53 attracts the driving member or armature 51 to rotate the shaft 54 and, consequently, the conveyor 20 at the slow speed.

The magnetic brake 58 has one side connected to the power supply by the line 77 and the opposite side connected to one contact 80 of a relay switch 81 by line 79. The brake remains de-energized from a previous bending cycle by having contacts 80 of relay switch 81 disengaged. Also, the magnetic brake 60 of the cycle dyne unit is energized via line 82 through the normally closed contacts 83 of relay switch 84 and the lines 85 and 86 while the clutch 59 of the unit is disengaged by the normally open contacts 87 of the relay switch 88. Furthermore, the electrically operated valve 89 remains de-energized from a previous bending cycle to supply fluid pressure to the lower ends of the cylinders 47.

A bending cycle is initiated by having a glass sheet, moving along the conveyor system, momentarily interrupt the light beam L received by the photoelectric cell which thereby temporarily completes the circuit through the solenoid 65 of the relay switch 66. Completion of the circuit through solenoid 65 will engage contacts 67 thereby completing the circuit via line 90 to the timer 91. The timer is set to delay action until the sheet has moved between the complemental shaping surfaces of the bending mold and into engagement with the respective locating devices 43 positioned in the path of the moving sheet. After this interval of time, the timer 91 completes a circuit via line 92 to solenoid 93 of relay switch 69, solenoid 94 of relay switch 81 and timers 95 and 96.

The completion of the circuit through the solenoid 93 of relay switch 69 will disengage the contacts 71 thereby interrupting the circuit to both of the driven magnetic members 52 and 53. Also, the completion of the circuit through solenoid 94 of relay switch 81 will engage contacts 80 to complete the circuit to the magnetic brake 58 which in turn will halt rotation of the shaft 54 and the conveyor 20.

The period of time required to move the sheet between the complemental shaping surfaces, disengage the magnetic member 53 and engage the brake 58 is monitored by the timing device 96 which, after this time interval, will complete a circuit via line 97 through solenoids 98 and 99 of relay switches 88 and 84, respectively, and at the same time will activate the timer 100. The completion of the circuit through the solenoids 98 and 99 will release the brake 60 and engage the clutch 59 to thereby allow the power source (not shown) to drive the shaft 40 through one revolution which will raise the sheet off the conveyor 20 and press it between the complemental shaping surfaces of the bending mold and thereafter return the bent sheet to the conveyor. The timer 96 will operate a sufficient period of time to complete one revolution of the shaft 40 after which it times out to thereby reverse the positions of the relays 88 and 84 and halt rotation of the shaft 40.

The timer 100 monitors an interval of time sufficient to allow the brake 60 to release and the clutch 59 to be engaged to begin the raising of the lower mold part. After this interval of time, the timer 100 will complete the circuit through valve 89 reversing the position of the valve to disconnect the conduit 48 from the fluid pressure supply line 101 and connect it to a vent line 102. The weight of the enlarged members or locators and the piston will be sufficient to descend by gravity below the path of the moving sheet forcing the fluid pressure out of the cylinders 47 through the vent line 102. The timer will operate a sufficient period of time to allow the sheet to be bent, returned to the conveyor 20 and moved into the tempering section whereupon the timer times out to reverse the position of the valve 89 and raise the stops for a subsequent bending cycle.

As was indicated above, the timer 95 is activated at the same time as the timer 96. The timer 95 monitors a period of time during which the glass sheet is lifted off the conveyor by the lower mold part, which is caused by the engagement of the clutch 59 and consequent rotation of the shaft 40. After this interval of time, a circuit is completed via line 103 through solenoid 104 of relay switch 81, solenoid 105 of relay switch 73 and solenoid 68 of relay switch 69. The completion of the circuit through solenoid 104 will disengage contacts 80 to de-energize the brake 58. Simultaneously therewith the completion of the circuit through solenoids 105 and 68 will engage the contacts 106 and 71, respectively, to complete the circuit through the magnetic member 52 which in turn will cause rotation of the shaft 54 at the more rapid rate of speed so that when the glass sheet is returned to the conveyor it is rapidly moved out of the bending section and into the tempering section.

The timer 95 will operate a sufficient period of time to allow the bent sheet to be moved from the bending section to the tempering section and thereafter will open the circuit through line 103 and, complete the circuit via line 76 to solenoid 74 of relay switch 75. The opening of line 103 will de-energize solenoid 105 causing contacts 106 to be disengaged by the action of spring-biased relay 73 thereby de-energizing driven member 52 and the simultaneous completion of the circuit through solenoid 74 will engage contacts 78 to complete the circuit through driven member 53. These combined actions will change the speed of the conveyor from the faster rate to the slower rate completing one bending cycle and leaving all the operative elements in position to begin another bending cycle.

In the production of curved windows and sheets of glass by a continuous automatic process such as set forth above, each time a run of a different size or curvature of glass sheets, commonly referred to as parts, is desired it requires shutting down the apparatus to replace the mold parts, particularly the lower mold part, with a shaping surface conforming in size and curvature to the bent sheets and locating devices positioned properly to halt each sheet in the desired position with respect to the shaping surfaces. Such a changeover necessarily decreases the output of a particular bending apparatus. Furthermore, ofttimes, when the stops are not positioned accurately with respect to the shaping surface, the mold may require replacement and rework to properly align the locating devices or stops in order to bend sheets to the desired configuration.

According to the invention, the efficiency of a continuous bending apparatus, such as the one outlined above, is greatly increased by making the bending mold capable of bending different size parts or sheets to varying curvatures. Thus, the invention contemplates producing bends in glass sheets of varying size and shape on the same mold parts by positioning the sheet on the shaping surface of the mold part so that the desired curvature may be produced in the finished unit. This is accomplished by adjustably mounting one or both of the locating devices on the base of the lower mold part to make it readily movable relative to the shaping surface. Therefore, each glass sheet fed into the bending area by the conveyor may be located with respect to the shaping surfaces of the bending mold by merely moving one or both of the locating devices. Furthermore, the movement of the locating devices can be accomplished while the bending apparatus is operating which eliminates costly shutdowns in adapting the bending means to run a different part.

To these ends, one or both of the locating devices may be mounted as illustrated in FIGS. 4 through 9. In the illustrative embodiment of the invention, the fluid cylinder 47 of the locating device 43, which has already been referred to, is formed by providing a cylindrical opening 109 in an elongated solid body 110 having an extension 111 adjacent one corner of the lower portion of the body. The extension and one face of the body thereby form a flat continuous surface 112, for a purpose to be described later.

The lower end of the opening is sealed with a plate 113 secured to the body by screws 114 which are received in tapped openings 115 in the body. The upper end of the opening is enclosed with a plate 116 having an enlarged opening 117 formed therein for receiving the rod 45 which carries the enlarged piston 46 and allows the air to flow from the cylinder when the piston is raised. As shown in FIG. 7, the piston 46 has enlarged portions 46a for guiding the piston and rod within the cylinder. The lower end of the body is further provided with a port 118 communicating with the opening 109 and the opposite end of the part is provided with a suitable coupling 119 to connect the conduit 48 to the opening.

The locating device 43 is mounted for relative movement with respect to the base along a support block 120 which is secured to the base 31 of the lower mold part by screws 121 extending through openings 122 in the base and received in threaded openings in the block. For this purpose, the flat continuous surface 112 (FIG. 8) is provided with a travel block 123 having an elongated plate 124 held in position on the surface by screws 125. The travel block is received in an elongated opening or recess 126 (FIG. 4) in the support block and guided for movement along the length of the opening.

The support block and travel block are provided with moving means 127 for imparting relative linear motion with respect to each other. The moving means 127 is illustratively shown as a rotatable member or lead screw 128 received in a threaded opening 129 in the travel block and having a reduced portion 130 at one end journaled in an opening 131 in a face plate 132 which encloses the open end of the opening 126 in the support block and is retained thereon by screws 133. The opposite end of the rotatable member or lead screw is provided with an elongated cylindrical reduced portion 134 journaled in a bore 135 located in the support block.

It is of course well known that in mass production of curved windows by the above process, the atmosphere adjacent the bending means is in a highly heated condition. Furthermore, as was indicated above, the invention contemplates positioning glass sheets of varying size and configuration on the same bending mold parts without interruption of the continuous process. To this end, the moving means 127 includes means for rotating the lead screw in either direction while the apparatus is in operation to thereby impart linear motion to the locating device 43. In the illustrative embodiment of the invention, the rotating means includes a spur gear 136 received in a recess 137 in the support block with the gear secured to the reduced portion 134 of the lead screw by a pin 138 forced through an opening 139. An independent element in the form of a long narrow rectangular bar 140 is provided with teeth 141 on one face thereof matching the teeth on the spur gear to intermesh therewith. In this way, linear motion may be imparted to the locating device 43 by an operator stationed outside the bending area who can force the teeth of the bar into engagement with the spur gear and rotating the gear in the appropriate direction.

The support block is further provided with means for locking the locating device 43 in an adjusted position. For this purpose, the support block is provided with a slot 142 intersecting the recess 137 with a locking member 143 received in the slot and pivotally retained therein by a pin 144 to engage one of the teeth of the spur gear and be retained therein by the force of gravity. An opening 145 is provided adjacent the free end of the locking member to receive a long rod or other suitable device (not shown) so that the locking member may be disengaged from the spur gear by an operator stationed outside the bending area.

Figure 2:
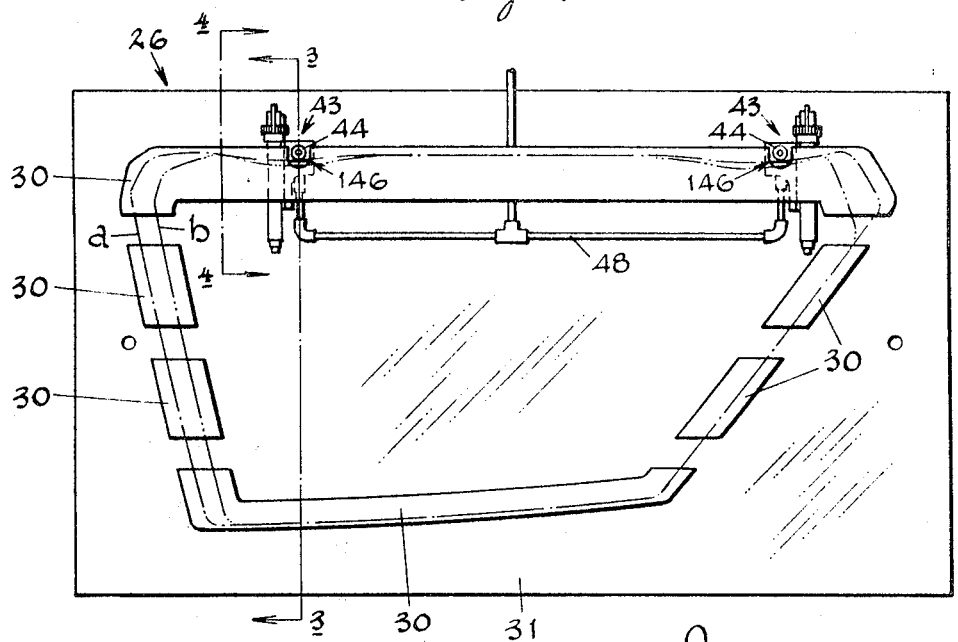
FIG. 2 is an enlarged plan view of the lower mold part of the bending apparatus shown in FIG. 1.

The operation of the improved bending apparatus can be readily understood with reference to FIG. 2. A plurality of different parts or glass sheets of varying size and configuration may be bent to a desired curvature on a single mold by merely moving one or both of the locating devices 43 to position the sheet on the mold in the desired location. By way of example, two such parts or sheets $a$ and $b$ having different size and configuration are shown in broken lines in FIG. 2. The two glass sheets may be bent on the same bending mold by merely moving the left or right hand locating device longitudinally of the path of movement of the sheet to thereby properly locate the sheet desired to be bent in the proper position.

As noted above, it is of course desirable to have the lower mold part a ring type structure so that only the marginal portions of the sheet are engaged thereby avoiding marring of the viewing portion of the sheet. However, in order to practice the invention to the fullest extent it has been found desirable to provide relatively wide bars 30 in order to accommodate a plurality of parts or sheets of varying size and configuration. Furthermore, it has also been found advantageous to have the bar 30 adjacent the locating device slightly larger than the remaining bars and provided with recesses 146 adjacent one edge thereof to accommodate a portion of the locating device. This arrangement will allow for a greater degree of linear movement of the respective locating devices towards and away from the opposite side of the mold part.

It has also been found desirable to provide a reference for readily determining the position of the respective locating devices with respect to the shaping surface of the lower mold part. For this purpose, the surface of the support block facing the outer edge of the mold part may be scribed at incremental points, as shown at 147, so that the position of one edge of the travel block is readily determined. Furthermore, if desired, limit stops in the form of rods 148 (FIG. 6) projecting from the upper surface of the base 31 may be provided to ensure that the enlarged members 44 will not be moved into engagement with the bar of the female mold part.

It will be readily appreciated that the improved bending apparatus of the invention will considerably increase the efficiency of a bending furnace since various sheets or parts may be run on a single mold by merely positioning one or both of the respective locating devices to locate the sheet on the mold part so that it will be bent to the desired curvature. Since this repositioning may be accomplished according to the invention while the furnace is in operation, the efficiency of the bending and tempering apparatus is greatly increased.

Although the improved retractable locating devices have been illustratively described as connected to and associated wtih the lower or female mold part it is readily apparent, and considered to be within the spirit of the invention, that the locating devices could readily be connected to the male or upper mold part. Also, it will be appreciated that the particular outline of the mold parts is dictated by the outline shape of the glass sheets to be bent and any desired outline may be used.

In fact, it is to be understood that the form of the invention herewith shown and described is to be taken as a preferred embodiment of the same, and that various changes in the shape, size and arrangement of parts may be resorted to without departing from the spirit of the invention.

We claim:

1. Apparatus for bending each of a plurality of glass sheets as they are moved one by one through a bending area including, in combination, a bending mold having a contoured shaping surface formed thereon, a conveyor adapted to advance heated glass sheets along a path past said shaping surface, locating means for positioning a sheet carried by said conveyor in bending relation to said shaping surface as said sheet moves into said bending area, said locating means including at least two stop members spaced apart across said path and operable to engage the leading edge of a sheet as it moves into position to be bent, means for retracting each of said stop members away from said conveyor to permit continued movement of a sheet on said conveyor along said path away from said bending area, and adjacent means for shifting said stop means relative to one another parallel to said path toward and away from said shaping surface to permit the angular relationship of the sheet relative to the bending mold to be varied in the plane of the sheet.

2. Apparatus for bending glass sheets as defined in rlaim 1, including means adapted to engage said adjusting means to lock each of said stop members in a preselected position.

3. Apparatus for bending glass sheets as defined in claim 1, wherein said adjusting means for each of the stop members comprises a support block mounted on said mold and disposed parallel to said path, means mounting said stop member on said support block for sliding movement relative thereto toward and away from said shaping surface and actuating means operating between said support block and said stop member, mounting means for selectively shifting said mounting means back and forth along said support block.

4. Apparatus for bending glass sheets as defined in claim 3, wherein said actuating means comprises a lead screw journaled in said support block and threaded through said mounting means, and means for rotating said lead screw.

5. Apparatus for bending glass sheets as defined in claim 1, wherein the shaping surface of said mold is of ring-type outline and the portion of said shaping surface engaged by the leading edge portion of the glass sheet is wider than the portions of said shaping surface engaged by the remaining edge portions of the sheet, said first-named portion of the shaping surface having transversely shaped notches formed therein to receive the stop members to engage the leading edge of the sheet when said sheet moves into position to be bent.

References Cited

UNITED STATES PATENTS

| | | | |
|---|---|---|---|
| 2,700,179 | 1/1955 | Benson | 65—287 XR |
| 2,876,594 | 3/1959 | McRoberts et al. | 65—287 |
| 3,230,066 | 1/1966 | Carson et al. | 65—287 |
| 3,338,695 | 8/1967 | Ritter | 65—289 XR |
| 3,361,552 | 1/1968 | Ritter | 65—287 XR |

S. LEON BASHORE, Primary Examiner

FRANK W. MIGA, Assistant Examiner

U.S. Cl. X.R.

65—107, 268, 305, 323

PO-1050
(5/69)

UNITED STATES PATENT OFFICE
CERTIFICATE OF CORRECTION

Patent No. 3,459,526        Dated August 5, 1969

Inventor(s)     Allwin Stickel & Floyd T. Hagedorn

It is certified that error appears in the above-identified patent and that said Letters Patent are hereby corrected as shown below:

```
Column 3, line 41, for "deired" read --desired--;
Column 9, line 31, for "adjacent" read --adjusting--;
Column 9, line 32, for "means" read --members--;
Column 9, line 36, for "rlaim" read --claim--.
```

SIGNED AND SEALED
MAY 19 1970

(SEAL)
Attest:

Edward M. Fletcher, Jr.
Attesting Officer

WILLIAM E. SCHUYLER, JR.
Commissioner of Patents